(12) United States Patent
Horacek et al.

(10) Patent No.: US 7,731,818 B2
(45) Date of Patent: *Jun. 8, 2010

(54) PROCESS FOR DEINKING WASTE PAPER

(75) Inventors: Bob Horacek, Monson, MA (US);
Jukka Jäkärä, Siivikkala (FI); Mikael Svedman, Vaasa (FI)

(73) Assignee: Kemira Oyj (FI)

( * ) Notice: Subject to any disclaimer, the term of this patent is extended or adjusted under 35 U.S.C. 154(b) by 465 days.

This patent is subject to a terminal disclaimer.

(21) Appl. No.: 11/570,452

(22) PCT Filed: Jun. 16, 2005

(86) PCT No.: PCT/FI2005/000283

§ 371 (c)(1),
(2), (4) Date: Dec. 12, 2006

(87) PCT Pub. No.: WO2005/124016

PCT Pub. Date: Dec. 29, 2005

(65) Prior Publication Data

US 2007/0246175 A1 Oct. 25, 2007

(30) Foreign Application Priority Data

Jun. 16, 2004 (FI) .................. 20040833

(51) Int. Cl.
*D21C 5/02* (2006.01)

(52) U.S. Cl. ............... 162/5; 162/6; 162/8; 162/13; 162/72

(58) Field of Classification Search ........ 152/5, 152/6, 8, 13, 72, 76, 78
See application file for complete search history.

(56) References Cited

U.S. PATENT DOCUMENTS

| 4,347,099 A | 8/1982 | De Ceuster et al. |
| 5,637,191 A | 6/1997 | Langley et al. |
| 5,660,684 A | 8/1997 | Li et al. |
| 6,784,146 B1 | 8/2004 | Luo et al. |

FOREIGN PATENT DOCUMENTS

| EP | 0708199 A1 | 4/1996 |
| EP | 0814193 A2 | 12/1997 |
| WO | 9608598 A1 | 3/1996 |
| WO | 2004063276 A1 | 7/2004 |
| WO | 2004063461 A1 | 7/2004 |
| WO | 2005047594 A1 | 5/2005 |

OTHER PUBLICATIONS

Search Report for Finnish Application No. FI20040833.
International Search Report; International Application No. PCT/FI2005/000283.
Written Opinion for International Application No. PCT/FI2005/000283.
U.S. Appl. No. 10/541,775 filed Mar. 10, 2006.

*Primary Examiner*—Mark Halpern
(74) *Attorney, Agent, or Firm*—Cantor Colburn LLP

(57) ABSTRACT

The present invention relates to a process for deinking waste paper comprising treating the waste paper with a peroxide compound in an aqueous alkaline medium in the presence of a first polymer (A) comprising a Ca-binding polymer in the form of a polycarboxylate polymer and a second polymer (B) comprising a poly-alfa-hydroxyacrylic acid or a salt thereof or the corresponding polylactone, said process additionally comprising treating the waste paper with at least one nonionic surfactant or with at least one combination of a nonionic surfactant and a fatty acid or a salt thereof to promote ink detachment and/or ink removal.

25 Claims, 4 Drawing Sheets

PROCESS FOR DEINKING WASTE PAPER

This application is a 371 of PCT/FI05/00283 filed on 16 Jun. 2005.

FIELD OF THE INVENTION

The present invention relates to a chemical deinking process comprising a special peroxide stabilizer comprising a calcium binding polymer and a polymer comprising an alkali salt of poly ($\alpha$-hydroxyacrylic acid) or the corresponding polylactone, and additionally a non-ionic surfactant instead of sodium silicate (water glass) and a fatty acid surfactant. The process produces a low ash containing deinked pulp which can be used for producing high grade tissue and fine paper.

BACKGROUND OF THE INVENTION

In the past deinking of waste paper was mainly practiced to obtain cheap raw material for newsprint production. In North America, washing system was practiced. In Europe, flotation system, which used alkali, sodium silicate and hydrogen peroxide in repulping of waste paper, was used. This kind of deinking did not normally comprise any bleaching stage within the main deinking system, but possibly a post-bleaching with sodium dithionite. During the past decade deinked pulp (DIP) has found increasingly place as a raw material for higher grade papers such as supercalandered (SC) and light weight coated (LWC) papers, which are used in magazines, catalogues etc., and in the production of fine papers, which are essentially woodfree and in tissue production. This has meant higher brightness target with high cleanness requirements. Flotation deinking and flotation deinking with two flotation stages comprising also an alkaline hydrogen peroxide bleaching stage has become more and more popular.

In order to detach the ink from the repulped waste paper alkali is added to swell the fibers and hydrogen peroxide is added for preventing alkali darkening. Sodium silicate (water glass) is added to buffer the system, to stabilize peroxide, to collect the ink and to prevent the redeposition of ink particles on fibers. In the deinking of woodfree (WF) papers, such as office papers, hydrogen peroxide and sodium silicate (water glass) is seldom used. In order to collect the disintegrated ink from the repulped waste paper, fatty acids as their calcium soaps were used as ink collectors. The calcium was separately added in the past, but since the current waste papers contain a lot of calcium containing pigments and fillers, a separate addition of calcium salts are seldom any more needed. In addition hard water and the closure of water circulations have contributed to the content of calcium.

At the moment the most used method for deinking waste paper is the flotation deinking. The configuration of the system depends much on the raw material and on the end use of the deinked pulp.

The most used system covers the following units. An alkaline repulping of waste paper in the presence of alkali and silicate for buffering and ink dispersion and in the presence of hydrogen peroxide for reducing alkali darkening of pulp. A surface active agent is also in general added into the pulping equipment. This is still quite often a fatty acid, which needs to be in form of a calcium salt in order to collect the disintegrated ink particles, though non-ionic synthetic surfactants are also used. After the repulping, the cleaning and screening section are following. There is, after this unit, the first flotation unit, flotation I, where the surfactant can also be added. After cleaning and screening a kneader or disperger is used to detach more residual ink. If higher brightness is needed for the deinked pulp, e.g. if the deinked pulp is not used for newsprint, but e.g. as raw material for SC or LWC paper or if mixed office paper is used as raw material, an alkaline hydrogen peroxide bleaching stage is followed, which is followed by the flotation II. This can then be followed by a reductive sodium dithionite bleaching stage, which is often practiced when deinked pulp is targeted for newsprint production and the process does not include the peroxide bleaching stage. The deinking can also be carried out at only one flotation stage and the process can also include washing stages, which are very common when deinked pulp is used for tissue production, when the low ash content in the tissue paper is important to the tissue properties. When colored papers are deinked the last bleaching stage can also be carried out by a reductive sodium formamidine sulfinic acid (FAS) for effective color reduction. If the production of DIP is connected to a paper mill the water introduced to the DIP process comes as so called white water from the paper mill. The DIP mills having two flotation units comprise normally two recycling water loops, which nowadays most often also comprise a microflotation unit for cleaning the waters to be recycled.

The conventional deinking process can also be such one that the repulping is carried out without hydrogen peroxide, but after the repulping of the wastepaper and the cleaning and screening section there is a disperger/kneader or soaking tower. The bleaching of the pulp is either carried out in the disperger or in the soaking tower, which is followed by only one flotation unit. This system is very much practiced when old newsprints or when old newsprint and magazines are deinked in order to produce pulp for newsprint production.

For every special application the DIP has a certain brightness target, but important parameters in the deinking is the residual ink content, speck count or area and yield. For the production efficiency as high yields as possible with target pulp properties is the goal in order to obtain good profitability. This means that as little as possible loss of fines and pigments and fillers present in the raw material waste paper, should occur. This is not always the case, when tissue is made, since the different tissues have specific low ash requirements. A part of this is achieved by selecting low ash containing waste papers such as low ash containing office paper as the raw material. Since the papers varies, the DIP process for tissue production, always comprise one or more washing stages, which will decrease the yield by removing fillers and pigments.

Also in deinking office papers, normally the so-called mixed office waste (MOW), which can contain at maximum 10-15% wood containing grades and other fiber materials such as different board materials, the low ash content is also an aim, since the mineral fillers and pigments can adversely affect the high brightness requirements and other pulp properties. Also, in deinking old news paper (ONP) and old magazine paper (OMP) raw materials for production of deinked pulp for production of SC and LWC paper, low ash content can also be the aim, since the ash can adversely affect strength properties.

A lot of different equipment, which have not been mentioned above can be used in the deinking processes.

Generally following chemicals are used in deinking:

Alkali is used in repulping in order to swell the fibers and thus to alleviate the detachment of ink from the fibers.

Sodium silicate (water glass) is used for buffering the system, for ink dispersion from the fibers, ink agglomeration, preventing ink redeposition and preventing decomposition of the used peroxide.

Hydrogen peroxide to counteract the darkening caused by alkali. Hydrogen peroxide is used also in a separate bleaching stage.

A flotation agent, i.e. a surfactant to collect the ink.

A foaming agent, if needed, to improve the function of the ink collector in the separation of foam.

Calcium ions to obtain collector properties, when fatty acids are used as ink collectors.

A chelating agent to prevent the decomposition of hydrogen peroxide by transition metal ions.

A biocide or an anticatalaze agent to inhibit the decomposition of hydrogen peroxide by catalaze enzyme.

The normal terms used, when making deinking performance studies are:

ERIC (Effective Residual Ink Concentration) in ppm.

Hyperwash, a special efficient washing, in which the loosely bound ink can be eliminated and the measurements done for the pulp describes the pure deinked pulp.

Dirt or speck count and area or image analysis depicting the contamination by residual ink etc.

Brightness or R 457 value.

Yield of the pulp based on the used amount of waste paper.

Problems associated with the use of sodium silicate and the current status of the technology.

As described earlier water glass is abundantly used in deinking of waste papers due to the many beneficial properties. Water glass causes also many problems, since it gives very easily deposits, especially in the presence of calcium in the fiber line and the carry-over of silicate with the water-containing pulp from the fiber line can cause runnability problems in the paper machine. Therefore it would be advantageous to replace the silicate, but this has not yet succeeded.

The surfactants used as ink collectors can be divided into the following classes:

Anionic surfactants including soaps, linear alkylbenzene sulphonates (LAS), fatty alcohol sulphates (FAS) and fatty alcohol ether sulphates (FEAS).

Cationic surfactants including quaternary ammonium compounds (QAC).

Ampholytic surfactants including ampholytic surfactants (AMPH).

Non-ionic surfactants including fatty alcohol ethoxylates (FAEO) and propoxylates (FAPO) and combinations thereof (FAEPO), nonylphenol ethoxylates (NPEO), and other surfactants, such as alkoxylated polyesters, fatty acid ethoxylates and propoxylates, ethoxylated vegetable oils etc.

Soap is still the dominant surfactant at least when old newsprint (ONP) and old magazines (OMG) are deinked, but it requires calcium ions in order to function as ink collector, but the calcium soap has among other things the drawback of causing deposit problems and negatively affecting the sheet properties, when deinked pulp is used in paper making. All the other surfactants have also some drawbacks, but they are used in special applications, e.g. in deinking of mixed office waste (MOW), in tissue production etc and in some countries and combined with certain kind of equipment when the certain benefits can be obtained and the normal drawbacks, such as the reduced yield of fillers is not of importance.

The use of sodium salt poly-($\alpha$-hydroxyacrylic acid) (PHAS) and the corresponding polylactone in deinking of ONP and OMG mixture is disclosed in U.S. Pat. No. 4,347,099 (Solvay, 1976). The deinking has been carried out in the presence of a fatty acid at specific hardness and also in the presence of a foaming agent.

It is also set forth in U.S. Pat. No. 4,347,099 that the PHAS and the ink collector can totally be omitted and a polyacrylic acid can be used in instead of PHAS. The only properties, which have been measured, are brightness and hydrogen peroxide consumption, in addition to the pH. The deinking is a complex process and also other parameters such as the yield, the amount of residual ink and speck area should be measured in order to assess the performance of the deinking process. It can also be noticed that different deinking systems are specific for the used waste papers and sometimes also for inks used in printing the paper. In addition to the required pulp properties, the yield in a deinking process is a very important factor, since the yield will define a part of the cost efficiency of the process. When ONP based only on old newsprints is deinked, a yield of 90-95% can be obtained. When waste papers containing fillers and mineral pigments, i.e. OMG, are used together with ONP, an average yield of 85% is obtained, while making deinked pulp for tissue production from this kind of raw materials the yield can be as low as 50%. In deinking of wood free grades, the yield is not always very important, e.g. when the deinked pulp is used for making uncoated fine paper. One tries to guarantee good properties of the end product paper and therefore the filler and pigments content, measured as ash content should be relatively low. This means that the yield can be below 80%, depending on the original filler and pigment content of the used raw material waste paper.

SUMMARY OF THE INVENTION

Now it has been surprisingly found that a combination of PHAS plus a calcium binding polymer as a peroxide stabilizer and a special surfactant can efficiently be used in the deinking of office waste paper and in the bleaching of deinked pulp without sodium silicate and in deinking of waste paper containing mechanical pulps for tissue production. The use of PHAS and a calcium binding polymer has been described in applicants international patent applications PCT/FI2004/000009 and PCT/FI2004/000010.

If a fatty acid based surfactant is used in the deinking, it needs to be as calcium salt in order to be an efficient ink collector. PHAS will bind calcium and will at the same time become more inefficient stabilizer for hydrogen peroxide. This function can be impoved by introducing a polymer which will bind more effectively calcium than PHAS. The reason for this is unknown, since though a polymer with higher calcium binding ability would be added, the amount of this is not enough to bind all the calcium and therefore there would be enough calcium to be bound by PHAS and render it inefficient. It has, however, been found that in the presence of fatty acids, PHAS and PHAS containing polymer compositions will not give such milky product as water glass, but a system also containing precipitates.

If a fatty acid based collector would be used in the deinking process, somehow PHAS or a combination of PHAS and a calcium binding polymer would render the fatty acid surfactant to a less efficient ink collector and to a less efficient flotation agent when sodium silicate is not used. The reason for this is not known, since at least in the deinking of OMG there is abundantly calcium available for generating fatty acid calcium soap. It has been found that in alkaline milieu PHAS and the combination of PHAS and a polycarboxylate polymer starts at least partly precipitate in the presence of fatty acid. This can be the reason for the inefficiency of PHAS and the polymer combination in a system with high calcium content, which is prevailing in the first flotation stage in deinking a mixture of ONP and OMG and in deinking woodfree waste papers containing fillers.

By using a more neutral ink collector flotation agent, the invented system can result in good deinked pulp regarding the pulp properties with targeted yield and avoiding the drawbacks of sodium silicate.

The surfactants to be used as ink collector according to the present invention are non-ionic surfactants, preferably fatty alcohol ethoxylates and propoxylates and fatty acid ethoxylates and propoxylates which have been obtained by reacting the substrates with either ethylene oxide or propylene oxide or with both ethylene oxide and propylene oxide, but also mixtures of the above mentioned substances with fatty acids in certain ratio can be used, especially when the calcium content in the system is not very high, e.g. not above 1000 ppm.

The system can also advantageously be used for deinking of waste office papers, which do not contain much mechanical papers, when low ash content is required. The invention can also advantageously be used in deinking of waste papers containing mechanical fibers with high filler and pigments contents, such as newsprint, magazine papers and the mixtures of these for making raw material pulp for tissue paper, since the invented system has the property to flotate well fillers and mineral pigments when waste papers containing mechanical fibers are used. Therefore the deinked pulp will have a low ash content, which is needed for softness in the tissue paper production.

DETAILED DESCRIPTION OF THE INVENTION

Figure 1A:
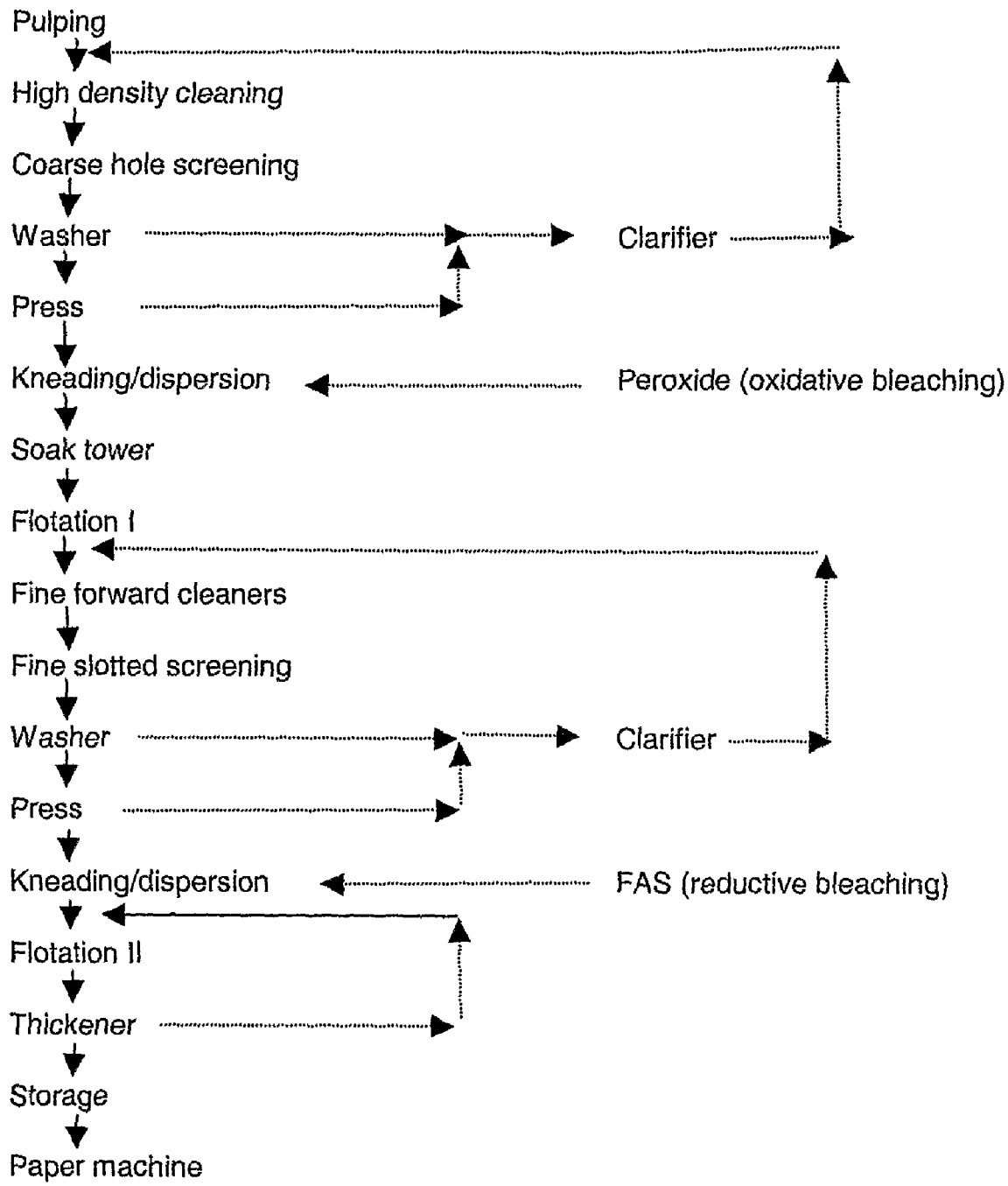
FIG. 1a depicts a deinking system for mixed office waste paper including two washing and two flotation stages, which system can be used for carrying out the process of the present invention.

According to the present invention there is provided a process for deinking waste paper comprising treating the waste paper with a peroxide compound in an aqueous alkaline medium in the presence of a first polymer (A) comprising a Ca-binding polymer in the form of a polycarboxylate polymer and a second polymer (B) comprising a poly-alfa-hydroxyacrylic acid or a salt thereof or the corresponding polylactone, said process additionally comprising treating the waste paper with at least one non-ionic surfactant or with at least one combination of a non-ionic surfactant and a fatty acid or a salt thereof to promote ink detachment and/or ink removal.

According to a preferred embodiment of the invention a combination of PHAS and a raw polycarboxylate polymer or a polymer composition made from the polylactone corresponding PHAS and a raw polycarboxylate polymer made according to applicants patent applications PCT/FI2004/000009 and PCT/FI2004/000010 is used in the deinking process. It was found that as good performance as with only PHAS can be obtained with the combination of PHAS and a raw polycarboxylate polymer and a polymer composition made from the polylactone corresponding PHAS and a raw polycarboxylate polymer. This is advantageous, since PHAS or the corresponding polylactone is much more expensive than the raw polycarboxylate polymers used in the invented systems. The polymer system is described more in detail in the following.

The Ca-binding polymer is preferably in the form of a raw polycarboxylate polymer (A). The conventional polycarboxylic acid polymers (polymer A) can be made by conventional radical polymerization of acrylic acid and/or methacrylic acid or by co-polymerization of acrylic and/or methacrylic acid with an olefinic dicarboxylic acid such as e.g. maleic acid or itaconic acid. The obtained raw polymer preferably has a pH of below 7, more preferably below 6, and most preferably below 5.

Polymers (A) and (B) can be introduced in the form of a solution containing both polymers. The polymer solution preferably has a pH of at most 7, more preferably at most 6, and most preferably at most 5.

The ratio of acrylic and/or methacrylic acid to the olefinic dicarboxylic acid is 100:0 to 0:100 mol-%, preferably 80:20 to 20:80, and most preferably 70:30 to 50:50 mol-%. Also higher contents of the olefinic dicarboxylic acid compounds can be used, but the polymerization will become more and more difficult when the share of the olefinic dicarboxylic acid is increased.

The molecular weights of the first polymer (A) can vary in big ranges, but should be at least 3000 g/mol, preferably at least 4000 g/mol, more preferably at least 10000 g/mol and most preferably at least 30000 g/mol. The second polymer (B) has a molecular weight of preferably at least 5000 g/mol, more preferably at least 10000 g/mol, and most preferably at least 15000 g/mol. Molecular weight can be even higher, although with very high molecular weights the viscosity of the product will increase considerably at high concentrations. The salt of the second polymer (B) is preferably an alkali metal salt, especially a sodium salt.

The ratio between polymer (A) and (B) can be varied to a large extent, but the share of the second polymer (B) should be from 1 to 50% by weight, preferably from 5 to 50% by weight, more preferably from 10 to 40% by weight, and most preferably from 10 to 30% by weight of the total amount of the polymers in the mixture.

The amount of the polymers (A) and (B) calculated as product according to the invention, which shall be added as a stabilizer instead of silicate, is preferably from 0.01 to 0.5% by weight (0.1-5 kg/ton pulp,) more preferably from 0.01 to 0.2% by weight (0.1-2 kg/tp), and most preferably from 0.02 to 0.1% by weight (0.2-1 kg/tp) of dry weight of waste paper pulp. The polymers can be added in all the places, where silicate has been used.

The addition points of the polymers (A) and (B) are preferably close to the addition points of the peroxide compound and the alkaline compound.

According to the invention the treatment with the peroxide compound in an aqueous medium in the presence of the polymers (A) and (B) can carried out in a pulper and/or in a bleaching step.

According to the invention the treatment with the non-ionic surfactant or with the combination of a non-ionic surfactant and a fatty acid or a salt thereof can carried out in a pulper followed by one or more flotation and/or washing steps.

According to the invention the treatment with the non-ionic surfactant or with the combination of a non-ionic surfactant and a fatty acid or a salt thereof can carried out in one or more flotation and/or washing steps.

According to the invention the treatment with the non-ionic surfactant or with the combination of a non-ionic surfactant and a fatty acid or a salt thereof can carried out both in a pulper and in one or more flotation and/or washing steps, wherein the non-ionic surfactant or the combination of a non-ionic surfactant and a fatty acid or a salt thereof used in the pulper and in the flotation and/or washing step(s) can be the same or different.

The combination of a non-ionic surfactant and a fatty acid or a salt thereof preferably comprises at most 50% by weight of the fatty acid or a salt thereof.

One embodiment of the process of the invention comprises at least one peroxide bleaching step followed by one or more flotation and/or washing steps carried out in the presence of a fatty acid or a salt thereof or the non-ionic surfactant or the combination of a non-ionic surfactant and a fatty acid or a salt thereof. Preferably such flotation and/or washing step(s) are carried out in the presence of a fatty acid or a salt thereof in an amount not exceeding about 90% by weight of the total amount of surfactants used in the deinking process.

The non-ionic surfactant used in combination with the above mentioned polymer system can be a fatty acid derivative of the general formula

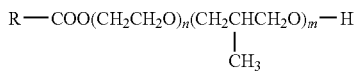

wherein R is a fatty acid alkyl group with C5-C21 carbon atoms, preferably C13-C19 carbon atoms and more preferably C15-C18 carbon atoms, n is the average number of ethylene oxide units and is from about 5 to 100, preferably from about 7 to 75, and more preferably from about 10 to 30, and m is the average number of propylene oxide units and is from about 0 to 30, preferably from about 3 to 25, and more preferably from about 4 to 20.

Also other kinds of non-ionic surfactants can be used, for example ethoxylated or both ethoxylated and propoxylated fatty alcohol derivatives of the general formula

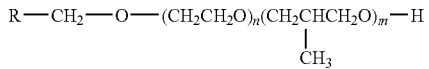

wherein R is a fatty alcohol alkyl group with C5-C21 carbon atoms, preferably C13-C19 carbon atoms and more preferably C15-C18 carbon atoms, n is the average number of ethylene oxide units and is from about 5 to 100, preferably from about 7 to 75, and more preferably from about 10 to 30, and m is the average number of propylene oxide units and is from about 0 to 30, preferably from about 3 to 25, and more preferably from about 4 to 20.

According to the invention a combination of the non-ionic surfactant and a fatty acid or a salt thereof can be used. The fatty acid has the following general formula

wherein R is a fatty acid alkyl group with C5-C21 carbon atoms, preferably C13-C19 carbon atoms and more preferably C15-C18 carbon atoms. The salt of the fatty acid can be an alkali metal salt, such as sodium or potassium, or an alkaline earth metal salt, such as calcium or magnesium.

The weight ratio of the non-ionic surfactant to the fatty acid or a salt thereof is preferably from 1:20 to 20:1, more preferably from 1:10 to 10:1 and most preferably from 1:3 to 3:1.

The non-ionic surfactant can be mixed with the fatty acid or a salt thereof either before addition to a processing unit of recovered paper or in conjunction to addition to a processing unit of recovered paper.

The total amount of the non-ionic surfactant or the combination of the non-ionic surfactant and the fatty acid or a salt thereof is preferably from 0.001 to 1.5% by weight, more preferably from 0.01 to 0.75% by weight, and most preferably from 0.15 to 0.5% by weight of dry waste paper.

The non-ionic surfactant or said combination can be used, not only in the repulping of waste paper, but can also be used in several places in the deinking line in order to obtain an optimized result. E.g. a part of the non-ionic surfactant or said combination can be added into the repulping of waste paper and a part into the first flotation stage and/or into the possible following flotation stages.

The waste paper to be deinked by the process of the invention can be recycled paper comprising essentially wood-free mixed office waste (MOW) and/or wood-containing old newsprint (ONP) and/or old magazine (OMG).

When the waste paper is recycled paper comprising essentially wood-free mixed office waste (MOW), the process preferably comprises treating the MOW is a pulper in the presence of the non-ionic surfactant or the combination of a non-ionic surfactant and a fatty acid or a salt thereof, followed by flotation and/or washing for ink removal, and thereafter bleaching with a peroxide compound in an aqueous alkaline medium in the presence of the first polymer (A) and the second polymer (B).

When the waste paper is recycled paper comprising essentially wood-free mixed office waste (MOW), the process can produce a deinked pulp having a low ash content, preferably less than 10% by weight, more preferably less than 5% by weight, and most preferably less than 3% by weight of dry pulp.

When the waste paper is recycled paper comprising wood-containing old newsprint (ONP) and/or old magazine (OMG), the process preferably comprises treating the ONP and/or OMG in a pulper with a peroxide compound in an aqueous alkaline medium in the presence of the first polymer (A), the second polymer (B), and the non-ionic surfactant or the combination of a non-ionic surfactant and a fatty acid or a salt thereof, followed by one or more flotation and/or washing steps for ink removal, and optionally bleaching with a peroxide compound in an aqueous alkaline medium optionally in the presence of the first polymer (A) and the second polymer (B) and/or with dithionite.

The process of the invention can comprise a first peroxide bleaching step followed by one or more flotation and/or washing steps and a second bleaching step, preferably comprising a reductive bleaching step, such as a sodium dithionite bleaching step or a sodium formamidine sulfinic acid step.

In the deinking of mixed office waste, where silicate is used only in the bleaching of the raw deinked pulp, the polymer system can be used instead of silicate. The same surfactant can be used in the repulping of waste paper as in the flotation stage(s). Depending of the raw materials and the inks, a non-ionic surfactant can be used in repulping and another one in the flotation after the hydrogen peroxide bleaching stage in order to achieve an optimal performance, i.e. the final pulp properties and yield. Also soap can be used as surfactant in the flotation stages after the peroxide stage, when the calcium content is low enough, lower than 1000 mg $Ca^{2+}$/l, preferably lower than 500 mg $Ca^{2+}$/l, most preferably less than 300 $Ca^{2+}$/l.

The optimal pH range in the bleaching in the presence the polymer system is from 7 to 13, preferably from 7 to 12 and most preferably from 7 to 11. Sodium carbonate can be added to the system in order to achieve a buffer action as with sodium silicate. The amount of the sodium carbonate addition as product is less than 50%, preferably less than 30 and most preferably less than 20% of the alkaline product addition. The amount should preferably be as big as in the sodium silicate system to obtain the same alkalinity. The alkali charge should be lower than normally in order to ensure that the pH do not rise too high and cause a decomposition of peroxide. In a silicate system the danger is much smaller since silicate can buffer the system.

The temperature in the bleaching can be from 30 to 90° C., preferably from 50 to 90° C., and most preferably from 60 to 90° C. The residence time in the bleaching can vary within a wide range, from 30 to 240 minutes, preferably from 45 to 180 minutes and most preferably from 60 to 120 minutes, The residence time will also depend on the temperature used in the bleaching.

Any consistency can be used in the bleaching stage but it is most preferably to use high consistency, but medium consistency can also be used.

In the deinking of waste papers containing mechanical fiber, such as ONP (old newsprint) and OMG (old magazines), the most preferable system comprises at least following steps: repulping, ink removal by flotation and/or washing, peroxide bleaching and ink removal by flotation and/or washing.

The systems according to the invention give pulp with a much lower mineral content, measured as ash content. Therefore the pulp is suitable as raw material for further processing in a complete deinking line to make pulp for tissue production, where a low ash content is needed. In summary this observed attribute is a preferential decrease in ash removal relative to other furnish solids such as fibers and fiber fines in the deinking process.

Thus, the process of the invention is especially advantageous to make deinked pulp for tissue production with low ash content. The ash content is preferably less than 10% by weight, more preferably less than 5% by weight, and most preferably less than 3% by weight.

The process of the invention can be a low yield process. For woodfree qualities the yield is typically less than 85% by weight, preferably less than 80% by weight, and more preferably less than 75% by weight. In respect of wood-containing qualities especially for tissue production the yields can be much lower than 75% by weight.

Figure 1B:
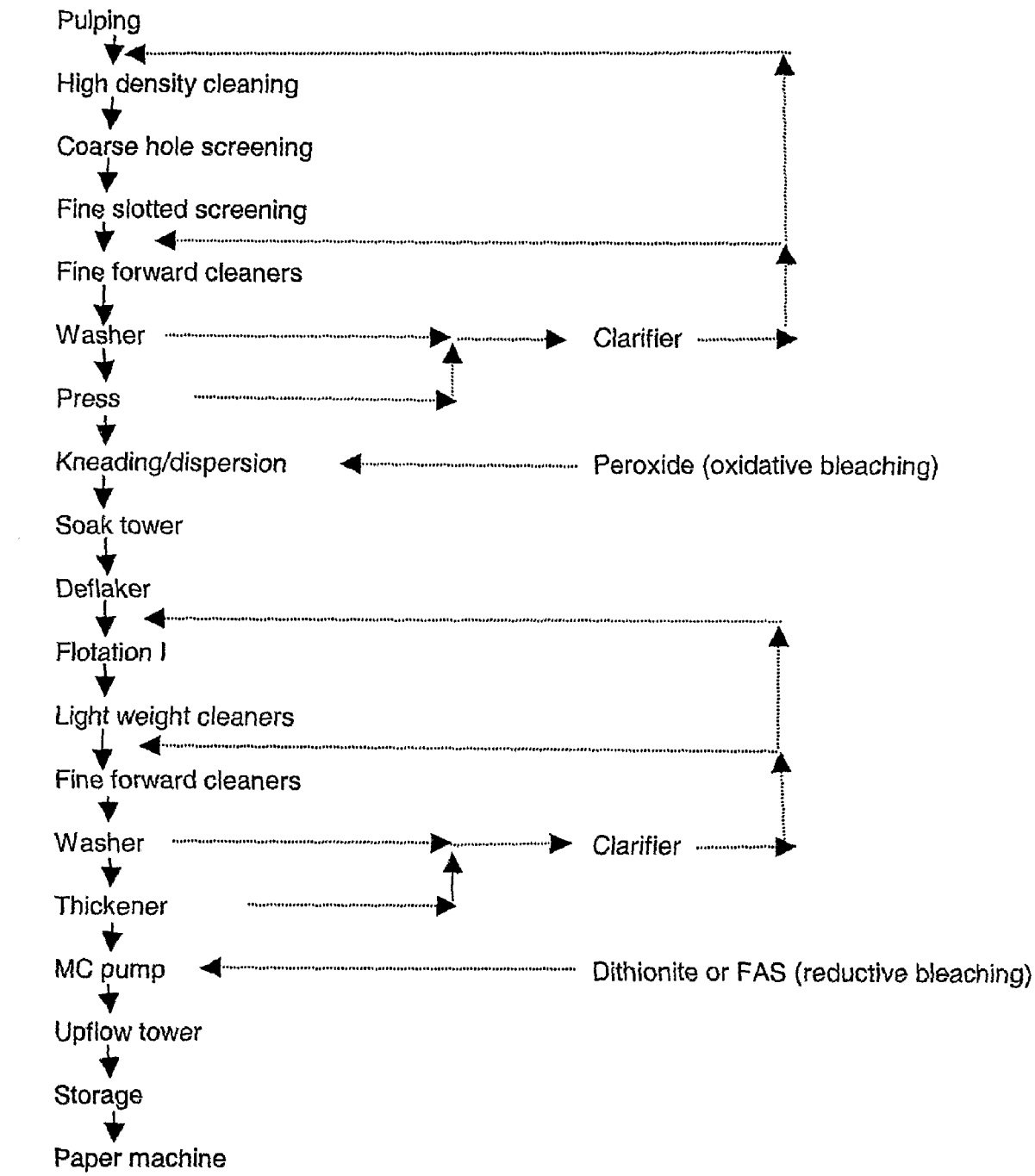
FIG. 1b depicts a deinking system for mixed office waste paper including two washing stages and one flotation stage, which system can be used for carrying out the process of the present invention.

The deinking process of the present invention can have several loops. Such systems for mixed office waste (Donald Dick, Sequence of unit operations in deinking plant design, TAPPI Pulping Conference 1992, p. 775, FIGS. 9 and 10) in principle are depicted in FIG. 1a and 1b. The systems comprise typically three, two or one flotation stage and two washing stages.

The system of FIG. 1a comprises two flotation stages and two washing stages in order to reduce the amounts of fillers and pigments. Oxidative bleaching with peroxide is carried out in a kneader or disperger after washing and before the first flotation I. The first flotation is followed by further cleaning and washing. Thereafter a reductive bleaching with FAS (sodium formamidine sulfinic acid) is carried out followed by the second flotation II.

The system of FIG. 1b comprises one flotation stages and two washing stages in order to reduce the amounts of fillers and pigments. Oxidative bleaching with peroxide is carried out in a kneader or disperger after washing and before the flotation I. The flotation is followed by further cleaning and washing. Thereafter a reductive bleaching with dithionite or FAS (sodium formamidine sulfinic acid) is carried out.

Also the water circulations are shown in FIG. 1a and 1b. Nowadays it is also common to use high consistency peroxide bleaching. Since the bleaching liquor will always carry substantial amounts of peroxide, the liquor is recycled, normally to pulping in order to utilize the residual peroxide. Since the peroxide bleaching according to the prior art is carried out in the presence of water glass, silicate will be introduced also into the pulping. This system is much used when waste paper containing mechanical fibers is used for making higher grades of deinked pulp for magazine papers, such as e.g. LWC. The raw material waste paper can then also contain mixed office waste, when high brightness is the target.

FIG. 1a and 1b are only examples of deinking systems/processes, where different additional pieces of equipment can be used and where the order of the different unit operations can be changed.

The water circulation is normally arranged counter-currently towards dirtier in the early stages of the process. E.g. water from the thickening after the $2^{nd}$ flotation after purification, normally by microflotation is returned from the end of the thickening stage to front of the second flotation and the filtrate from the peroxide bleaching stage is transferred to post-flotation and/or backward (in the process chain) to flotation or pulping stages before peroxide bleaching stage. The repulping and first flotation stages also comprise a separate water purification stage, normally by microflotation to the repulping. Of course the commercial systems are more complicated including more recycling loops, fresh water feeding and purge of some parts of the waters to the effluent water system. If the deinking plant is connected to paper mill, the feed water to carry pulp from the storage chest is normally purified water, so-called white water from the paper mill. A part of this is also fed into the water coming from the thickening operation and which after it is recycled in front of the second flotation.

In deinking of office waste paper it is quite normal that water glass and peroxide are not introduced into the pulping, but since the wash liquor after the peroxide bleaching carried out conventionally in the presence of water glass, is recycled to the repulping of waste paper or to flotation stages, both peroxide as residual peroxide in the returned washing liquor and silicate will be present in the deinking operation.

FIGS. 1a and 1b depict also quite well the deinking system of waste papers containing mechanical fibers, such papers as newsprint, magazine papers etc, where the invented system can be used. Normally the repulping is carried out in the presence of hydrogen peroxide and sodium silicate, but this does not necessarily need to be the case, since deinking can be carried out without hydrogen peroxide, but the peroxide is used in a disperger/kneader or in a soaking tower before the first and often the only flotation stage. The special washing stages, which are intended for the removal of pigments and fillers in the original waste paper, are not, however, normally used, but can be used in production of tissue, fine paper and LWC paper, since high yield is wanted.

The invented system is also especially advantageous to make deinked pulp for tissue production with low ash content.

In tissue production the deinking can also comprise only one flotation loop, which loop can be followed by one or more washing loops in order to achieve the required low ash content.

In this specification the percentages are % by weight unless otherwise specified.

EXAMPLE 1

This example describes the preparation of a stabilizer according to the invention from PHAS and from polymer A.

An acrylic acid copolymer (copolymer A) was made using conventional radical copolymerization technique from acrylic acid and maleic acid in molar ratio 60:40. The weight average molecular weight of the copolymer was about 44000 g/mol. The copolymer solution was diluted to active content 24% by weight. The pH of the solution was about 4.

The copolymer solution was mixed with a PHAA polymer (as an alkaline sodium salt=PHAS) having a weight average molecular weight of about 30000 and an active content of 30% by weight. The active content ratio PHAS:copolymer A was 1:4. The mixture was a clear product having pH 4.8, dry content 24% by weight and viscosity about 50 mPas at 25° C. The solution remained clear for several days.

By increasing or decreasing the amount of PHAS, different polymer compositions can be made.

Different kinds of copolymers A with different ratios between acrylic or methacrylic acid and maleic acid or itaconic acid can be made in the similar way as described above, which allows to make different copolymer A—PHAS combinations.

EXAMPLE 2

This example describes the preparation of a stabilizer according to the invention from the polylactone and polymer A.

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to the active contents given in table 1, and the pH thereof was about 4. A moist polylactone powder, having a molecular weight of about 30000 g/mol and an active content of 67.6% by weight, was added to the copolymer A solutions listed in table 1 under vigorous stirring at room temperature. The active content ratio polylactone:copolymer A was 1:4. After addition of all polylactone mixing was continued under gentle stirring 1.5 h, during which all insoluble solids remained after vigorous stirring stage were dissolved. The final product mixtures had clear appearance, pH 3.9 and other properties listed in Table 1. Samples were stored at room temperature.

As it can be seen the products below 30% solids content show low viscosities enough in order to be fed easily with normal pumping equipment. By increasing or decreasing the amount of the polylactone, different polymer compositions can be made.

EXAMPLE 3

Tests of PHAS in the Presence of Fatty Acid and Alkali.

The different combinations of caustic soda plus PHAS and soap were compared with the standard soda plus silicate plus soap system in deionised water containing 500 mg $Ca^{2+}$/l. The chemicals were added in the same amounts as when the trials were carried out at a 16% consistency in the pulper, i.e. caustic soda 0.7%, sodium silicate 2.0%, soap 0.7% and the sodium salt of poly (α-hydroxyacrylic acid)=PHAS 0.25%.

The visual inspection gave the following end results

TABLE 2

| System | Visual result |
| --- | --- |
| soda | Transparent |
| PHAS | transparent |
| Caustic soda plus PHAS | Opaque |
| Caustic soda plus soap | Milky |
| PHAS plus caustic soda | Opaque |
| Caustic soda plus silicate | Transparent |
| Caustic soda, PHAS and soap | Milky with a precipitate |
| Caustic soda, soap and PHAS | Milky with a precipitate |
| PHAS, caustic soda and soap | Milky with a precipitate |
| Caustic soda, silicate and soap | Milky |

It can be seen that in hard water, i.e. at relatively high calcium concentration, PHAS system will get a precipitation independent of the order of addition, while a silicate system gives a milky system. This will give an indication that PHAS will not be compatible with an alkaline soap system at high calcium concentration, which prevails at the pulping and flotation stage, when magazine papers with high calcium content, or wood free papers with high filler content or when the recycled or used fresh water contains a high calcium content.

Mixing non-ionic surfactant with alkaline soap solution together with PHAS did not cause any precipitation.

EXAMPLE 4

Deinking of Office Paper in Pilot/Laboratory Plant
General Features for Pilot/Laboratory Plant Deinking.

TABLE 1

| Exp. No. | Active content of copolymer A solution, % | Copolymer A solution in mixture, g | Moist polylactone in mixture, g | Active content of the final mixture, % | viscosity at 25° C. at once, mPas | viscosity at 25° C. after 1 week, mPas |
| --- | --- | --- | --- | --- | --- | --- |
| 786 A1 | 30 | 200 | 22.2 | 35 | >5000 | 4020 |
| 786 A2 | 25 | 200 | 18.5 | 30 | >5000 | 1080 |
| 786 A3 | 22 | 200 | 16.3 | 26 | 1550 | 360 |
| 786 A4 | 20 | 200 | 14.8 | 24 | 1410 | 306 |
| 786 A5 | 17 | 200 | 12.6 | 21 | 279 | 83 |

About 30 kg of mixture of 70% of coated wood free (WF) (European standard grade 2.08 waste paper, without possible heavily printed circulars) and 30% WF paper printed with toner were used in the experiments.

The raw material mixture was pulped without alkali addition with two kinds of non-ionic surfactant in a Helico batch pulper at 16-17% consistency (Cs) at 45° C. for 15 minutes. 0.1% of Rhoditec 1000 (Rhodia S.A, France), an alkoxylated fatty alcohol was added into the pulping. The other one was a fatty acid alkoxylate based surfactant, Lionsurf 737 (Kemira Chemicals Inc., USA). The dosage was 0.075% as commercial product. The pulp was washed in a classifier at an about 1% inlet Cs and 6% outlet Cs. The pulp was then thickened in a screw press to about 36-40% Cs The pulp was heated to 70° C. and the bleaching chemicals were added. Due to this dilution the consistency dropped to about 30%. The bleaching was carried out in an insulated retention screw, which had a 20 minutes retention time either after a low-speed kneading or before a high-speed disperger. In the case of the kneader, the bleaching chemicals were added into the kneader. The dosage of hydrogen peroxide was 1% of the pulp.

Figure 2:
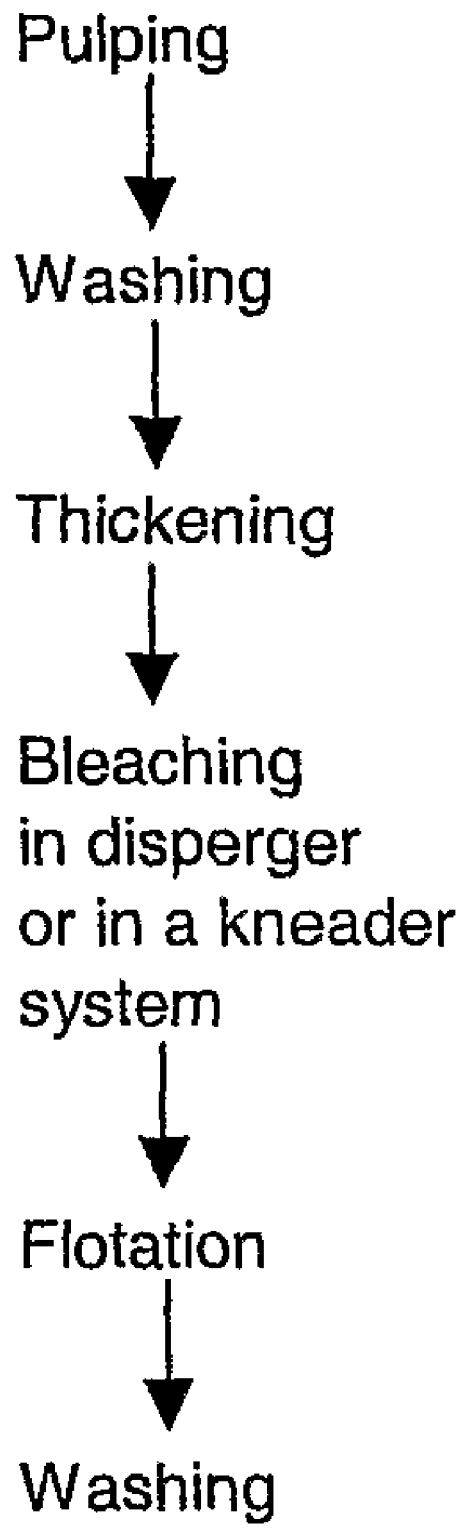
FIG. 2 depicts a deinking system for mixed office waste paper used in the experiments in Example 4.

This system simulated the first deinking loop (FIG. 2)

The bleaching was carried out with three different systems:

silicate bleaching: 2.5% of commercial sodium silicate solution (concentration 36.5% and $Na_2O/SiO_2$ ratio 1:3.4), 1% of NaOH and 0.15% of a commercial 40% sodium salt solution of DTPA 0.25% of 30% of PHAS commercial PHAS solution, MW about 30000, 1% of NaOH and 0.15% of DTPA 0.5% of 25% solution of a 1:4 mixture of PHAS and a maleic acid -acrylic copolymer made according to example 1, 1% of NaOH and 0.15% of DTPA.

All the percentages are calculated based on the weight of oven dried (od) pulp.

The second deinking loop was simulated in the laboratory scale using a 25 liters Voith flotation cell at a consistency of 10 g/l and a residence time of 7 minutes. The air ratio was 170%. 0.7% of soap, or 0.1% Rhoditec 1000 or 0.075% Lionsurf 737 was used as flotation agent. The postwashing was carried out in a Degussa cell.

Tap water containing 75 mg $Ca^{2+}$/l was used in all the experiments.

TABLE 3

The total results after postwashing, when an alkoxylated fatty alcohol was used in pulping and a retention-disperger system in the bleaching.

| Conditions Pulping Chemical Bleaching treatment | Rhoditec 1000 | | | | | |
|---|---|---|---|---|---|---|
| Post-flotation chemical | Silicate | | PHAS | | Polymer | |
| Property | Soap | R | Soap | R | Soap | R |
| Brightness % ISO | 71.7 | 71.6 | 76.0 | 76.7 | 77.2 | 76.7 |
| ERIC | 39 | 66 | 31 | 71 | 23 | 33 |
| Ink detachment % | 94.6 | 89.5 | 96.1 | 88.9 | 95.9 | 94.9 |
| Total yield % | 56.4 | 56.6 | 57.3 | 56.3 | 57.0 | 56.6 |

R = Rhoditec 1000, an alkoxylated fatty alcohol, Rhodia S. A., France
Soap = Serfax MT 90, Stephenson Group Ltd., UK
Polymer = the 1:4 PHAS: polymer mixture according to the example 1.

A similar experiment was carried out with an alxoxylated fatty acid as the pulping chemical.

TABLE 4

The total results after postwashing, when an alkoxylated fatty acid was used in pulping and a retention-disperger system in the bleaching.

| Conditions Pulping Chemical Bleaching treatment | Lionsurf 737 | | | | | |
|---|---|---|---|---|---|---|
| Post-flotation chemical | Silicate | | PHAS | | Polymer | |
| Property | Soap | L | Soap | L | Soap | L |
| Brightness % ISO | 73.5 | 72.4 | 74.2 | 73.7 | 74.7 | 74.5 |
| ERIC | 34 | 32 | 32 | 26 | 27 | 29 |
| Ink detachment % | 96.4 | 96.0 | 96.8 | 96.4 | 97.5 | 97.7 |
| Total yield % | 58.1 | 57.9 | 58.2 | 60.0 | 60.1 | 58.4 |

L = Lionsurf 737, an alkoxylated fatty acid, Kemira Chemicals Inc., USA
Soap = Serfax MT 90, Stephenson Group Ltd., UK
Polymer = the 1:4 PHAS:polymer mixture according to the example 1.

When assessing the results, the results should only be compared with each others and not as in absolute terms, since the system did not contain the reject recycling, water circulation etc. This means that e.g. that lower yields than in a commercial deinking line were obtained.

It can be seen that both PHAS and the polymer containing only 20% of the PHAS amount can give comparable results as silicate in the complete deinking regarding the main properties of deinked pulp. The brightness with PHAS or with the polymer system was always higher than when using silicate in the bleaching.

It can also be seen that soap can be used in the flotation when the biggest amount of the calcium has been removed from the system, which is the case in post-flotation, when the calcium content of the original pulp has decreased, but the final results in general is lower than when the non-ionic surfactants had been used.

Both kinds of non-ionic surfactants can be used in both pulping-washing system and in flotation. Since the different kinds of non-ionic surfactants have a little different behaviour, the surfactants can also be combined, i.e. have a surfactant in pulping and the other one in the flotation. It can also be seen that by using the cheaper polymer composition according to the invention, the end products will not suffered compared with the results using PHAS.

TABLE 5

The amount of residual peroxide after a retention-disperger bleaching system

| | | | Residual peroxide % | |
|---|---|---|---|---|
| | | Pulping chemical | R | L |
| Bleaching system | | Silicate | 18% | 36% |
| | | PHAS | 29% | 37% |
| | | Polymer | 30% | 52% |

R = Rhoditec 1000, an alkoxylated fatty alcohol, Rhodia S. A., France
L = Lionsurf 737, an alkoxylated fatty acid, Kemira Chemicals Inc., USA
Polymer = the 1:4 PHAS: polymer mixture according to the example 1.

It can be seen that especially the polymer according to the invention gave a higher peroxide residual, while the brightness of the pulp was higher

TABLE 6

The total results after postwashing, when an alkoxylated fatty alcohol was used in pulping and a kneader-retention system was used in the bleaching.

| Conditions | | | |
|---|---|---|---|
| Pulping Chemical | Rhoditec 1000 | | |
| Bleaching treatment | Silicate | PHAS | Polymer |
| Post-flotation chemica | Soap | Soap | Soap |
| Property | | | |
| Brightness % ISO | 72.1 | 77.0 | 76.8 |
| ERIC | 68 | 61 | 57 |
| Ink detachment % | 88.6 | .90.0 | 89.3 |
| Total yield % | 57.1 | 57.1 | 57.0 |

TABLE 7

The total results after postwashing, when an alkoxylated fatty acid was used in pulping and a kneader-retention system was used in the bleaching.

| Conditions | | | |
|---|---|---|---|
| Pulping Chemical | Lionsurf 737 | | |
| Bleaching treatment | Silicate | PHAS | Polymer |
| Post-flotation chemica | Soap | Soap | Soap |
| Property | | | |
| Brightness % ISO | 72.0 | 72.9 | 72.9 |
| ERIC | 41 | 35 | 31 |
| Ink detachment % | 95.2 | 95.6 | 97.1 |
| Total yield % | 55.7 | 59.3 | 59.8 |

It can be seen that comparable results with the retention-disperger bleaching system and soap in the flotation can be achieved, and the PHAS and the polymer system will give higher brightness.

EXAMPLE 5

Simulation of an Industrial Office Waste Paper Deinking Line.

Pulp sample from an industrial mixed office waste deinking plant after the first deinking loop was taken. The pH of the industrial sample was about 8.4 Since it was assumed that the sample did not contain enough specks, a toner based office paper was pulped and acidified, after which the possible calcium carbonate filler was decomposed by acidification, filtered and pH adjusted to about 8.4.

12% of this pulp was mixed with the sample from an industrial process.

The properties of the pulps are described in the following.

TABLE 8

| | | Pulp Characteristics | | | |
|---|---|---|---|---|---|
| Pulp | Property | Property unit | Industrial pulp sample | Toner pulp | Chest |
| Entire pulp | Brightness | % ISO | 72.4 | 59.7 | 70.2 |
| | Residual ink | ERIC (ppm) | 66 | 726 | 136 |
| Hyper-washed pulp | Brightness | % ISO | 77.1 | 72.2 | 77 |
| | Residual ink | ERIC (ppm) | 24 | 239 | 48 |

TABLE 8-continued

| | | Pulp Characteristics | | | |
|---|---|---|---|---|---|
| Pulp | Property | Property unit | Industrial pulp sample | Toner pulp | Chest |
| Entire pulp | Speck contamination | Number (nb/m$^2$) | 6 280 | 607 890 | 86 045 |
| | | Area (mm$^2$/m$^2$) | 137 | 12 160 | 1 656 |

Figure 3:
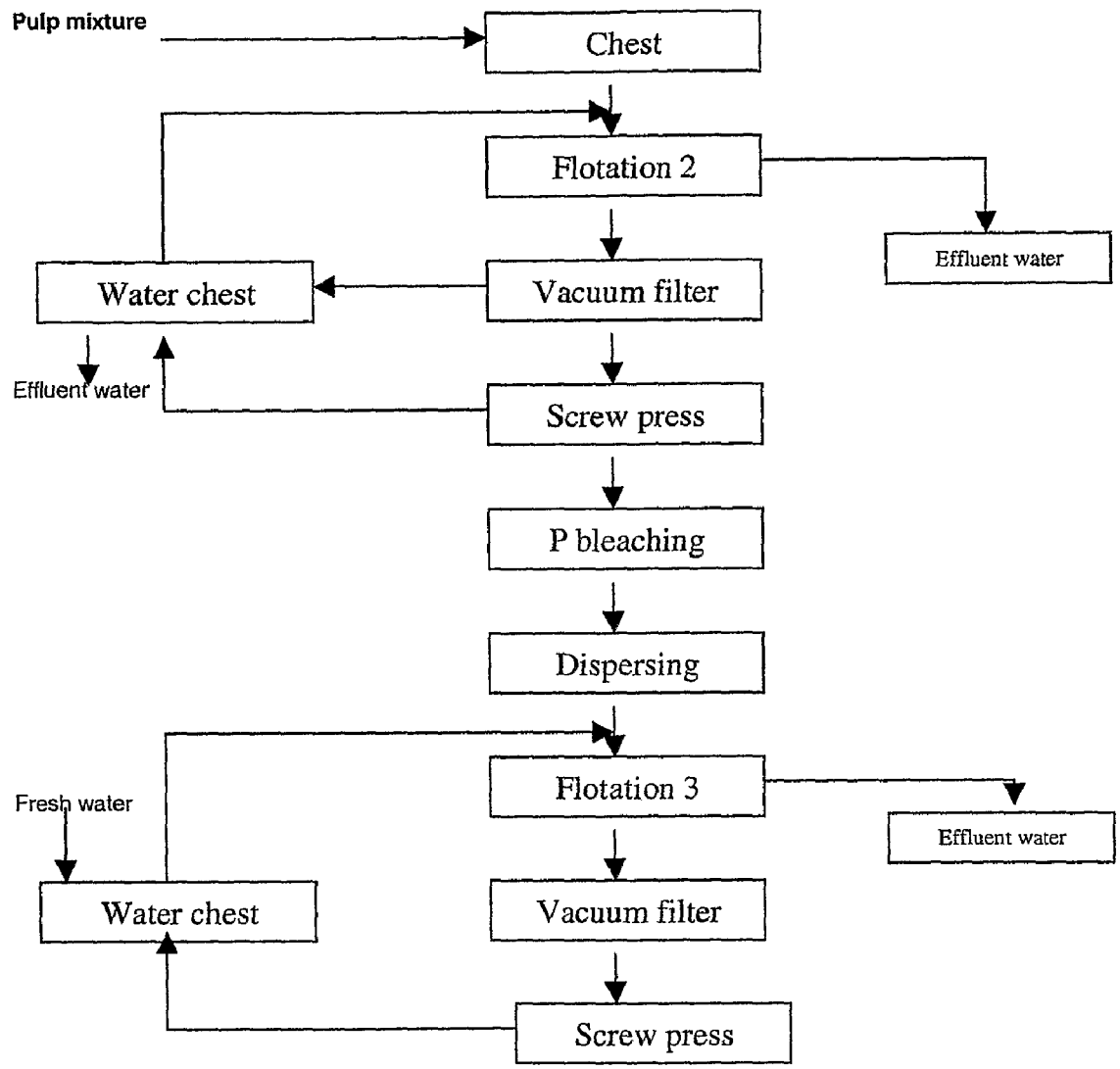
FIG. 3 depicts a deinking system for mixed office waste paper used in the experiments in Example 5.

The pH of the pulps used in the tests (measured in chest) was about 7.2 to 7.9. The deinking system is depicted in FIG. 3.

In all the trials the water introduced was artificially hardened to 300 mg $Ca^{2+}$/l.

About 30 kg/h of the artificially contaminated office waste paper pulp was introduced to flotation, under similar conditions as described in example 4. 0.075% of Lionsurf 737 was added as the flotation chemical. The pH at the flotation inlet after dilution was 7.4, 7.9 and 7.7 in the three experiments. After the flotation the pulp was vacuum filtered and then pressed to a 24% consistency, before the pulp was fed into a pilot bleaching stage.

The bleaching conditions are described in the following.

TABLE 9

| Name of the trial | Chemicals introduced in bleaching | pH |
|---|---|---|
| Silicate | Silicate 11.6 kg/odtpulp, i.e. 1.16% Caustic soda 0.221% Hydrogen peroxide 1.04% (as 100%) | 10.2 |
| Polymer 5 kg | Polymer 5 kg/odt pulp, i.e. 0.5% Caustic soda 0.354% Polymer 5 kg/odt pulp, i.e. 0.5% Hydrogen peroxide 1.04% (as 100%) | 9.1 |
| Polymer 2.5 kg | Caustic soda 0.354% Polymer 2.55 kg/odt pulp, i.e. 0.25% Hydrogen peroxide 1.04% (as 100%) | 9.0 |

Polymer According to Example 1

The bleaching in a pilot system could only have a 20 minutes retention time, and therefore only this bleaching time could be tested. When using silicate in the bleaching the brightness results in the pilot and laboratory was the same, while using the polymer according to the invention, the more controlled laboratory conditions yielded to a better bleaching efficiency. When using a laboratory bleaching a 90 minutes bleaching time could not much change the bleaching result when the polymer was used instead of silicate.

It must be noticed that the amount of caustic soda used in the experiments had not been enough to raise the pH to the same level as in the experiment. The bleaching efficiency would therefore been even better, if a certain amount of excess alkali had been added in the experiments with the polymers according to the invention.

The pulp was introduced to a high speed disperger and then into the flotation 3 in laboratory, into which 0.3% (300 ml/tp) Lionsurf 737 was added. The pH in flotation was 9.2 when silicate had been used and 8.9-8.8 when the polymers had been used in the bleaching. The pulp was filtered in vacuum and pressed in a screw press and the final properties measured.

TABLE 10

Test results

| Property/trial | Silicate | Polymer 5 | Polymer 2.5 |
|---|---|---|---|
| Brightness % ISO | 78.6 | 78.0 | 78.8 |
| Brightness % ISO, hyper washed pulp | 80.3 | 80.7 | 81.1 |
| Brightness % ISO with UV on | 95.9 | 95.6 | 94.7 |
| Brightness % ISO UV on, hyperwashed pulp | 97.8 | 98.6 | 98.1 |
| ERIC ppm | 31 | 23 | 22 |
| ERIC ppm, hyperwashed pulp | 26 | 12 | 17 |
| Specks $mm^2/m^2$ | 25 | 22 | 14 |
| Specks nb/m2 | 1147 | 870 | 614 |
| Mean speck diameter μm | 167 | 179 | 170 |
| Process yield % | 91.8 | 91.7 | 90.1 |
| Ash content % | 1.7 | 1.1 | 1.1 |
| Ash removal % | 63 | 76 | 76 |
| Residual peroxide % in pilot plant for 20 min | 88 | 67 | 81 |
| Ink removal based on ERIC | 78.5 | 84.2 | 84.2 |
| Speck removal based on area | 98.6 | 98.7 | 99.2 |
| Speck removal based on number | 98.7 | 99.0 | 99.3 |

Brightness difference without UV and UV on gives a measure for the content of optical brighteners in the pulp.

It can seen that at least as good end results in deinking could be achieved, when the polymers according to the invention were used instead of the silicate in the bleaching stage.

The achieved ash content with the polymer according to the invention was, however, much lower than when a silicate based system was used. This enables to use the system for deinking office waste paper for making pulp for high grade printing and writing papers, where the pulp should have a low ash content in order to get a good and even properties for paper making.

It has to be mentioned that the residual bleaching liquor was not recycled into the $2^{nd}$ deinking loop, see FIG. 3.

EXAMPLE 6

Deinking of Wood Containing Waste Paper

In the trials the following mixture of wood containing waste papers was used:
- 40% offset ONP (old newsprint)
- 20% offset heatset on SC paper
- 20% offset OMG (old magazines)
- 20% rotogravure SC Pulpings were carried out in a Helico pulper at a consistency of 16% and at a temperature of about 45° C. and tap water containing 70 g $Ca^{2+}$/l was used as the feed water. The pulpings were carried out in the following systems
- K1=2% of commercial sodium silicate solution and 0.7% of soap
- K2=0.25% of PHAS and 0.3% of Lionsurf 737
- K3=0.25% of PHAS and 0.3% of Lionsurf 5140
- K4=0.5% of the polymer and 0.7% of soap
- K5=0.5% of the polymer and 0.3% of Lionsurf 737
- K6=0.5% of the polymer and 0.3% of Lionsurf 5140
- Soap=Serfax MT 90
- Lionsurf 737=an alkoxylated fatty acid
- Lionsurf 5140=a mixture of alkoxylated fatty acid and fatty acids, about 50:50% by weight
- Polymer=the 1:4 PHAS:polymer mixture according to the example 1.

K5 and K6 represent the present invention.

The pulping time were varied from 3 to 20 minutes, but only the reports for 10 minutes are reported.

After the pulpings, the pulps were filtered and pressed and then diluted with tap water to a 1% consistency. The flotation was carried out in Voith laboratory flotation cell for 7 minutes at 45° C. with an air ratio of 170%.

After filtering, washing and pressing, the pulps were bleached in plastic bags for 1 hour at 80° C. and at 15% consistency. The common additions were 1% of sodium hydroxide on oven dried pulp, 1% hydrogen peroxide (as 100%) and 0.3% of commercial DTPA pentasodium salt solution. In the bleaching experiment either 2.5% of sodium silicate solution, or 0.25% of PHAS solution or 0.5% of the 25% polymer solution according to the invention were used.

TABLE 11

Experiments and results after 10 minutes pulping and after bleaching

| System/property | K1 silicate + soap | K2 PHAS + Lionsurf 737 | K3 PHAS + Lionsurf 5140 | K4 Polymer + soap | K5 Polymer + Lionsurf 737 | K6 Polymer + Lionsurf 5140 |
|---|---|---|---|---|---|---|
| After pulping and 1st flotation | | | | | | |
| Ink removal index % | 71.8 | 82.4 | 73.9 | 76.0 | 73.9 | 78.8 |
| Specks nb/m2 | 7108 | 5747 | 6396 | 6609 | 5859 | 5987 |
| Specks mm2/m2 | 510 | 369 | 424 | 441 | 408 | 397 |
| Ash content % | 18 | 12.3 | 13.3 | 16.6 | 14.5 | 14.5 |
| Foam volume | 0.717 | 1.321 | 1.355 | 0.87 | 1.456 | 1.226 |
| After bleaching with silicate | | | | | | |
| Brightness % ISO | 65.6 | | | | | |
| ERIC ppm | 260 | | | | | |
| Residual peroxide with PHAS | 0.41 | | | | | |
| Brightness % ISO | | 65.5 | 65.1 | | | |
| ERIC ppm | | 217 | 275 | | | |

TABLE 11-continued

Experiments and results after 10 minutes pulping and after bleaching

| System/property | K1 silicate + soap | K2 PHAS + Lionsurf 737 | K3 PHAS + Lionsurf 5140 | K4 Polymer + soap | K5 Polymer + Lionsurf 737 | K6 Polymer + Lionsurf 5140 |
|---|---|---|---|---|---|---|
| Residual peroxide | | 0.21 | 0.44 | | | |
| With polymer | | | | | | |
| Brightness % ISO | | | | 64.0 | 63.8 | 63.3 |
| ERIC ppm | | | | 328 | 265 | 248 |
| Residual peroxide | | | | 0.38 | 0.13 | 0.13 |

It can be seen that with PHAS and the polymer system as good results as with a total silicate based system can be achieved. The system with the polymer according to the invention gives a little lower brightness, but the reason for this is that the alkali content has been too high, which can be seen in that that the residual peroxide content is very low, which means that hydrogen peroxide is consumed in decomposition due to the too high pH compared with the silicate system. Silicate can buffer the pH, but the polymer does not have the same strong effect.

It can also be noticed that the ash content of the deinked pulp already after the first flotation is much lower than in a conventional system with silicate. Since the deinking line can include at least one more flotation stage or one or more washing stages, when the pulp is intended for tissue production, the invented system will be advantageous in the whole deinking line for making deinked pulp for tissue production.

The invention claimed is:

1. A process for deinking waste paper comprising treating the waste paper with a peroxide compound in an aqueous alkaline medium in the presence of polymers, said process comprising introducing the polymers in the form of a polymer solution having a pH of at most 7 and comprising a first polymer (A) comprising a Ca-binding polymer in the form of a polycarboxylate polymer which is a copolymer of acrylic acid and/or methacrylic acid with maleic acid or itaconic acid, and a second polymer (B) comprising a poly-alpha-hydroxyacrylic acid or a salt thereof or the corresponding polylactone, said process additionally comprising treating the waste paper with at least one non-ionic surfactant or with at least one combination of a non-ionic surfactant and a fatty acid or a salt thereof to promote ink detachment and/or ink removal.

2. The process of claim 1 wherein the Ca-binding polymer is in the form of a raw polycarboxylate polymer (A).

3. The process of claim 2 wherein the Ca-binding raw polycarboxylate polymer (A) comprises a raw copolymer obtained from the copolymerization of acrylic acid and/or methacrylic acid with maleic acid or itaconic acid, said raw polymer having a pH of below 7.

4. The process of claim 1 wherein the polymer solution has a pH of at most 6.

5. The process of claim 1 wherein the first polymer (A) has a molecular weight of at least 4000, and the second polymer (B) has a molecular weight of at least 5000.

6. The process of claim 1 wherein in the first polymer (A) the molar ratio of acrylic acid and/or methacrylic acid to maleic acid and/or itaconic acid is from 80:20 to 20:80.

7. The process of claim 1 wherein the share of the second polymer (B) is from 1 to 50% by weight of the total amount of the first polymer (A) and the second polymer (B).

8. The process of claim 1 wherein the amount of the polymers (A) and (B) is from 0.01 to 0.5% by weight of dry waste paper pulp.

9. The process of claim 1 wherein the addition point of the solution of polymers (A) and (B) is close to the addition points of the peroxide compound and the alkaline compound.

10. The process of claim 1 wherein the treatment with the peroxide compound in an aqueous medium in the presence of the polymers (A) and (B) is carried out in a pulper and/or in a bleaching step.

11. The process of claim 1 wherein the treatment with the non-ionic surfactant or with the combination of a non-ionic surfactant and a fatty acid or a salt thereof is carried out in a pulper followed by one or more flotation and/or washing steps.

12. The process of claim 1 wherein the treatment with the non-ionic surfactant or with the combination of a non-ionic surfactant and a fatty acid or a salt thereof is carried out in one or more flotation and/or washing steps.

13. The process of claim 1 wherein the treatment with the non-ionic surfactant or with the combination of a non-ionic surfactant and a fatty acid or a salt thereof is carried out both in a pulper and in one or more flotation and/or washing steps, wherein the non-ionic surfactant or the combination of a non-ionic surfactant and a fatty acid or a salt thereof used in the pulper and in the flotation and/or washing step(s) can be the same or different.

14. The process of claim 1 wherein the combination of a non-ionic surfactant and a fatty acid or a salt thereof comprises at most 50% by weight of the fatty acid or a salt thereof.

15. The process of claim 1 wherein the process comprises at least one peroxide bleaching step followed by one or more flotation and/or washing steps carried out in the presence of a fatty acid or a salt thereof or the non-ionic surfactant or the combination of a non-ionic surfactant and a fatty acid or a salt thereof.

16. The process of claim 15 wherein the flotation and/or washing step(s) are carried out in the presence of a fatty acid or a salt thereof in an amount not exceeding about 90% by weight of the total amount of surfactants used in the deinking process.

17. The process of claim 1 wherein the non-ionic surfactant comprises a fatty acid derivative of the general formula

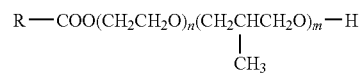

wherein R is a fatty acid alkyl group with C5-C21 carbon atoms, n is the average number of ethylene oxide units and is from about 5 to 100, and m is the average number of propylene oxide units and is from about 0 to 30.

18. The process according to claim 1 wherein the non-ionic surfactant comprises a fatty alcohol derivative of the general formula

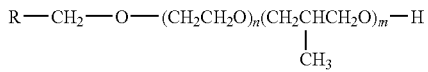

wherein R is a fatty alcohol alkyl group with C5-C21 carbon atoms, n is the average number of ethylene oxide units and is from about 5 to 100, and m is the average number of propylene oxide units and is from about 0 to 30.

19. The process of claim 1 wherein the total amount of the non-ionic surfactant or the combination of the non-ionic surfactant and the fatty acid or a salt thereof is from 0.001 to 1.5% by weight of dry waste paper.

20. The process of claim 1 wherein the waste paper is recycled paper comprising essentially wood-free mixed office waste (MOW) and/or wood-containing old newsprint (ONP) and/or old magazine (OMG).

21. The process of claim 1 wherein the waste paper is recycled paper comprising essentially wood-free mixed office waste (MOW), said process comprising treating the MOW in a pulper in the presence of the non-ionic surfactant or the combination of a non-ionic surfactant and a fatty acid or a salt thereof, followed by flotation and/or washing for ink removal, and thereafter bleaching with a peroxide compound in an aqueous alkaline medium in the presence of the first polymer (A) and the second polymer (B).

22. The process of claim 1 wherein the waste paper is recycled paper comprising essentially wood-free mixed office waste (MOW) and wherein the process produces a deinked pulp having an ash content less than 10% by weight of dry pulp.

23. The process of claim 1 wherein the waste paper is recycled paper comprising wood-containing old newsprint (ONP) and/or old magazine (OMG), said process comprising treating the ONP and/or OMG in a pulper with a peroxide compound in an aqueous alkaline medium in the presence of the first polymer (A), the second polymer (B), and the non-ionic surfactant or the combination of a non-ionic surfactant and a fatty acid or a salt thereof, followed by one or more flotation and/or washing steps for ink removal, and optionally bleaching with a peroxide compound in an aqueous alkaline medium optionally in the presence of the first polymer (A) and the second polymer (B) and/or with dithionite.

24. The process of claim 1 wherein the process comprises a first peroxide bleaching step followed by one or more flotation and/or washing steps and a second bleaching step.

25. The process of claim 1 wherein the polymer solution has a pH of at most 5.

* * * * *